(12) United States Patent
Tsori

(10) Patent No.: US 8,357,280 B2
(45) Date of Patent: Jan. 22, 2013

(54) ELECTRIC-FIELD INDUCED PHASE SEPARATION IN LIQUID MIXTURES

(75) Inventor: Yoav Tsori, Lehavin (IL)

(73) Assignee: Ben Gurion University of the Negev Research & Development Authority, Beer Sheva (IL)

(*) Notice: Subject to any disclaimer, the term of this patent is extended or adjusted under 35 U.S.C. 154(b) by 983 days.

(21) Appl. No.: 12/304,306

(22) PCT Filed: Jun. 18, 2007

(86) PCT No.: PCT/IL2007/000737
§ 371 (c)(1),
(2), (4) Date: Jan. 6, 2009

(87) PCT Pub. No.: WO2007/148328
PCT Pub. Date: Dec. 27, 2007

(65) Prior Publication Data
US 2009/0188801 A1    Jul. 30, 2009

Related U.S. Application Data

(60) Provisional application No. 60/814,581, filed on Jun. 19, 2006, provisional application No. 60/848,380, filed on Oct. 2, 2006.

(51) Int. Cl.
*B03C 9/00* (2006.01)
(52) U.S. Cl. .................................... 204/554; 204/660
(58) Field of Classification Search .................. 204/554
See application file for complete search history.

(56) References Cited

U.S. PATENT DOCUMENTS

| 4,019,915 A | 4/1977 | Miyauchi et al. |
| 4,579,637 A | 4/1986 | Jaisinghani et al. |

(Continued)

FOREIGN PATENT DOCUMENTS

WO    WO 92/04522    3/1992

OTHER PUBLICATIONS

Tsori et al., "Demixing in Simple Fluids Induced by Electric Field Gradients" Nature 430, pp. 544-547 (2004).*

(Continued)

*Primary Examiner* — Harry D Wilkins, III
*Assistant Examiner* — Bryan D. Ripa
(74) *Attorney, Agent, or Firm* — Roach Brown McCarthy & Gruber, P.C.; Kevin D. McCarthy

(57) ABSTRACT

The invention is a method of phase separation in liquid mixtures comprising two or more components. The method comprises the steps of inserting the liquid mixture between suitably shaped and positioned electrodes and applying a voltage to the electrodes in order to produce a non-uniform electric field between the electrodes. The phase separation takes place with essentially all electrode geometries and the phase separation is reversible. The method is characterized in that the liquid mixture must contain dissociated positive or negative ions. In this case the phase separation takes place when the applied voltage is a few volts or less and when the temperature is many degrees above the binodal (coexistence) temperature Tc. The invention has many practical applications including: electrical field controlled lubrication, influencing the kinetics and spatial dependence of chemical reactions in liquid environments, controlling the propagation of light, and controlling the opacity of a window.

5 Claims, 3 Drawing Sheets

U.S. PATENT DOCUMENTS

| | | | |
|---|---|---|---|
| 4,702,817 | A | 10/1987 | Ryan et al. |
| 5,489,506 | A | 2/1996 | Crane |
| 2002/0150827 | A1 | 10/2002 | Kawai et al. |
| 2003/0047456 | A1 | 3/2003 | Medoro |

OTHER PUBLICATIONS

Tsori et al., "Phase-Separation in Ion-Containing Mixtures in Electric Fields" PNAS 104(18), pp. 7348-7350 (2007).*

International Preliminary Report on Patentability for PCT/IL2007/000737; mailed Dec. 22, 2008—9 pages.

P. Debye and K. Kieboth, J. Chem. Phys. 42, 3155 (1965).

Y. Tsori, F. Tournilhac & L. Leibler, Nature 430, 544 (2004).

Yoav Tsori and Ludwik Leibler, PNAS, vol. 104, No. 18, May 1, 2007; published online Apr. 18, 2007, www.pnas.org_cgi_doi_10.1073_pnas.0607746104.

S. Reich, J. M. Gordon, "Electric field dependence of lower critical phase . . . mixtures", Journal of Polymer Science: Polymer Physics, vol. 17, Issue 3 , pp. 371-378, (1979).

L. D. Landau & E. M. Lifshitz, Electrodynamics of Continuous Media, 1st ed., Nauka, Moscow (1957)—one page entitled Probleme.

* cited by examiner

ELECTRIC-FIELD INDUCED PHASE SEPARATION IN LIQUID MIXTURES

CLAIM OF PRIORITY

The present application claims priority as a 371 of international application PCT/IL2007/000737, filed on Jun. 18, 2007; which claims priority to (a) U.S. provisional patent application Ser. No. 60/814,581, filed on Jun. 19, 2006 and (b) U.S. provisional patent application Ser. No. 60/848,380, filed on Oct. 2, 2006.

FIELD OF THE INVENTION

The invention is related to the field of phase separation in liquid mixtures. In particular the invention is related to the field of phase separation induced by electric fields in liquid mixtures.

BACKGROUND OF THE INVENTION

Publications and other reference materials referred to herein, including reference cited therein, are incorporated herein by reference in their entirety and are numerically referenced in the following text and respectively grouped in the appended Bibliography which immediately precedes the claims.

Phase transitions are important and frequently useful because they bring about sharp changes in material properties. Usually the trigger for a phase transition is a change in the ambient temperature or pressure. A phase transition can also be induced by the action of external fields such as magnetic or electric fields or gravity. The effect of a uniform electric field on the phase diagram of liquid mixtures was considered many years ago by Landau and Lifshitz, who predicted that for mixtures of simple liquids an electric field will raise the critical temperature $T_c$ by a minuscule amount (typically <0.01K), usually resulting in phase separation [1]. In their treatment, the change in $T_c$ resulted from the nonlinear dependence of the dielectric constant $\in$ on the mixture composition. However, experiments dating back to Debye and Kleboth [2] have shown that, on the contrary, the application of an electric field induces mixing.

The inventor has previously shown that an external electric field can induce phase separation in liquid mixtures, provided that the fields are non-uniform [3]. Variations in the intensity of the electric field are generic and occur in all electrodes unless special care is taken to eliminate them. When a liquid mixture is subjected to such a spatially non-uniform field, the situation is very different from the Landau scenario. The direct coupling between field variations and composition fluctuations gives rise to a dielectrophoretic force that tends to "suck" the component with the higher dielectric constant into the region with the high electric field.

Suppose an A/B binary mixture initially lies in the homogeneous region of a phase diagram, above the coexistence temperature but below $T_c$, and that the A component has a higher dielectric constant $\in$ than the B component. Then, the concentration of the A-liquid will be higher in the high-field region (B will occupy the rest of the space). At a critical field (or voltage), where the composition crosses into the unstable part of the phase diagram, a phase-transition occurs: a sharp interface between the A-rich and the B-rich domains is created, and the mixture is no longer homogeneous in equilibrium. As the voltage is further increased, the location of the front and the compositions of the A-rich and B-rich domains change. The transition line between a homogeneous and a separated mixture thus changes. This change can be 50 to 100 times larger than the change in uniform fields (Landau mechanism). However, one still has to be closer than about 1 degree from the coexistence temperature of the liquids, and apply rather high voltages (~300V).

In order to make practical application of the results shown in this work, there is a need for a method that will overcome these two problems, i.e. tight temperature regulation and high voltages.

It is therefore a purpose of the present invention to provide method that improves upon the prior art by allowing electric field induced phase separation over a wide range of temperatures and using relatively low voltages.

Further purposes and advantages of this invention will appear as the description proceeds.

SUMMARY OF THE INVENTION

The invention is a method of phase separation in liquid mixtures comprising two or more components. The method comprises the steps of:
  a. inserting the liquid mixture between suitably shaped and positioned electrodes; and
  b. applying a voltage to the electrodes in order to produce a non-uniform electric field between the electrodes.

The phase separation takes place with essentially all electrode geometries and the phase separation is reversible. The method is characterized in that the liquid mixture must contain dissociated positive or negative ions. In this case the phase separation takes place when the applied voltage is a few volts or less and when the temperature is many degrees above the binodal (coexistence) temperature.

For typical liquid mixtures containing dissociated ions, phase separation can take place when the applied voltage is one volt or less and the temperature is up to tens of degrees above the binodal (coexistence) temperature of the mixture.

The method of the invention can be used to produce electrical field controlled lubrication. For this application the method comprises:
  a. providing a liquid mixture comprising two or more components and containing dissociated positive or negative ions;
  b. providing suitably shaped and positioned electrodes;
  c. inserting the liquid mixture between the electrodes; and
  d. applying a voltage to the electrodes in order to produce a non-uniform electric field between the electrodes.

The method of the invention can be used to influence the kinetics and spatial dependence of chemical reactions in liquid environments. For this application the method comprises:
  a. providing a liquid mixture comprising two or more components and containing dissociated positive or negative ions;
  b. providing suitably shaped and positioned electrodes;
  c. inserting the liquid mixture between the electrodes; and
  d. applying a voltage to the electrodes in order to produce a non-uniform electric field between the electrodes.

The method of the invention can be used to control the propagation of light. For this application the method comprises:
  a. providing a liquid mixture comprising two or more components and containing dissociated positive or negative ions;
  b. providing suitably shaped and positioned electrodes;
  c. inserting the liquid mixture between the electrodes; and
  d. applying a voltage to the electrodes in order to produce a non-uniform electric field between the electrodes.

The method of the invention can be used to control the opacity of a window. For this application the method comprises:
   a. providing a liquid mixture comprising two or more components and containing dissociated positive or negative ions;
   b. providing two parallel transparent sheets coated with thin electrodes that are patterned with regular/irregular shapes
   c. inserting the liquid mixture between the electrodes; and
   d. applying a voltage to the electrodes in order to produce a non-uniform electric field between the electrodes.

A related method of reversibly controlling the opacity of a window method comprises the steps of:
   a. inserting a liquid mixture between two parallel transparent sheets coated with thin electrodes; and
   b. applying a voltage to the electrodes in order to produce a non-uniform electric field between the electrodes in a direction perpendicular to the electrodes;

This method is characterized in that the liquid mixture must contain two or more immiscible components. In this case the non-uniform electric field causes the liquid interface to become unstable due to the strong electrostatic forces and creates modulations on the surface of the liquid. These modulations take place when the applied voltage is a few volts or less and when the temperature is many degrees below the binodal (coexistence) temperature.

All the above and other characteristics and advantages of the invention will be further understood through the following illustrative and non-limitative description of preferred embodiments thereof, with reference to the appended drawings.

DETAILED DESCRIPTION OF PREFERRED EMBODIMENTS

Figure 1:
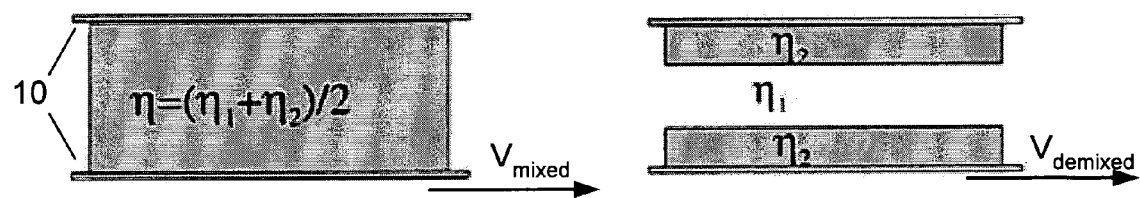
FIG. 1 schematically shows electrically controlled lubrication between two surfaces.

Briefly, the present invention is a method of causing electric field induced phase separation in liquid mixtures made up of several components. The usual behavior, which is the basis of prior art methods, is that when the mixture is cooled it phase-separates to its components. In contrast, according to the present invention, the mixture is left in the high-temperature regime, i.e. above the coexistence (binodal) temperature but below $T_c$, and an electric field is applied. The mixture's components then separate, segregating to different locations in space, depending on the properties and configuration of the electrodes. The phase-transition is accompanied by a change in the rheological, optical and chemical properties of the mixture, which can be utilized in many applications, examples of which will be given hereinbelow.

The problems of tight temperature regulation and high voltages that were discussed hereinabove are solved in the present invention by allowing for the inclusions of positive and negative dissociated ions in the solution. The ions drift to the electrodes under the influence of the electric field, and create a thin screening layer. Even at moderate voltages and practically independent of the electrode geometry, the resulting electric field gradients are very large, sufficient to drive the phase-separation process. In addition, the demixing layer created near the walls (electrodes) is very thin—just a few nanometers in width, depending on the ion content and the applied field's frequency. It should be emphasized that the underlying physical mechanism is very different from the one outlined in the earlier work of the inventor [3]. The model used to develop the present invention and the theoretical analysis are fully disclosed in an article [4] co-authored by the inventor of the present invention, the description of which, including publications referenced therein, is incorporated herein by reference. It is sufficient to say here that the predictions for the demixing voltage, dependence on temperature, etc., are different and new when compared to the disclosure in [3].

In [4] is described a type of phase transition occurring in ion-containing liquid mixtures under the influence of an external electric field. It is shown that in liquid mixtures containing dissociated ions, in contrast to the Landau case and to what was reported in reference [3] described hereinabove, the electric field is screened, and the resulting gradients in the field and ion density lead to strong electro- and dielectrophoretic forces that tend to separate the mixture into its components. It is shown that, if the mixture is initially in the homogeneous phase, this screening can bring about a robust phase-separation transition with three main features: (i) the phase separation is expected to occur in any electrode geometry, (ii) the voltage required is typically of the order of 1 V and even less, (iii) since the electric field decays rapidly away from the electrode, the composition gradients can be very large even if T is above $T_c$.

If T is smaller than $T_c$, then there is a "real" phase transition. This means that in principle the mixture composition is discontinuous (or very close to that). If $T > T_c$, there are sharp composition gradients too, but in principle the composition is continuous. However for practical purposes this option may also be useful. Note that the novel feature of the phase-transition is that it takes place for $T < T_c$.

In [4], it is seen that a liquid mixture phase-separates into its components when put under the influence of an electric field in some reasonable conditions, i.e. applied voltage of few volts and as far as tens of degrees above the coexistence (binodal) temperature of the mixture. The dissociated ions in the solution are important because they bring about large field gradients even with a flat electrode geometry. Field gradients give rise to a dielectrophoretic force that acts to pull the liquid with high dielectric constant toward the region with high field (the low dielectric component is attracted to the low field). This tendency is accompanied by another equally important electrophoretic tendency, where the ions attracted to the electrodes preferentially "drag" with them one of the liquid components. This second effect can enhance or negate the dielectrophoretic phase separation, depending on the solubility of the ions in the liquid components.

For small enough potential, the composition of the liquid component having the high dielectric constant (the A component) is enhanced close to the walls, but the profile remains smooth. There exists a threshold voltage V above which phase-separation occurs, and the composition profile changes dramatically: A-rich and A-poor domains are separated by a sharp interface as was first shown in [3]. The thickness of the A-rich domain can be extremely small, and depends nonlinearly on the ionic content in solution as well as on the applied voltage.

For an ion-containing mixture, the nonlinear dependency on the voltage means that increase in V changes the field's spatial distribution in addition to its amplitude even for homogeneous mixtures. This is in contrast to ion-free mixtures, such as those considered in [3], where in homogeneous mixtures the applied voltage does not affect the field distribution, only the amplitude. As a result, in ionic mixtures increase of the voltage increases the composition difference between phase-separated domains and may increase or decreases the thickness of the enrichment layer close to the electrodes. Thus, the physics of the phase separation considered here is unique.

The field-induced phase separation has some important implications in several circumstances. Some examples of applications that could benefit from electric-field-induced phase-transitions follows:

The first application relates to the rheological behavior in systems with moving parts, that is field-controlled lubrication. Essentially, the phase-separated mixture has a smaller effective viscosity than the homogeneous one, due to a creation of a thin lubrication layer close to the surfaces. This state is reversible so that when the field is turned off, the mixture becomes homogeneous again. This effect is illustrated in FIG. 1, which schematically shows electrically controlled lubrication between two surfaces.

On the left of FIG. 1 a homogeneous liquid mixture is shown confined between two flat surfaces/electrodes (10) and is subjected to a fixed shear force. As a reasonable approximation, the viscosity is close to the average of the two components: $\eta=\frac{1}{2}(\eta_1+\eta_2)$ and the sliding velocity of the top surface is denoted as $V_{mixed}$. When the shear force is stopped and a potential is applied, separation of the solution components results and two very thin (few nanometers) lubrication layers are created. On the right side of FIG. 1 is shown the situation when the shear force is reapplied. In this case the sliding velocity, denoted as $V_{demixed}$, can be considerably larger than $V_{mixed}$ if the components' viscosities are very different, because of the presence of the lubrication layers at the two surfaces. This reversible transition can be useful in MEMS and NEMS.

To illustrate the magnitude of the effect, in a typical binary mixture of alkanes and siloxane oils (squalane and polymethyiphenylsiloxane), the viscosity ratio is 10; thus, the effective viscosity of the demixed liquid is decreased by a factor 10 as compared with the mixed solution. A different prominent example is a water-glycerol mixture. However, note that in this case a real phase transition is not expected but rather simply the creation of enrichment layers at the surfaces. Other liquid pairs may prove to be more useful.

Phase-separation could also be interesting in chemical reactions in small confined places: when two or more chemical species are undergoing a chemical reaction in a mixture of liquid solvents, application of a non-uniform electric field can be used to phase-separate the liquids. This phase separation can have two major consequences: (i) If the reactant species exist preferentially in one liquid solvent (say A), phase separation will lead to their accumulation into the A-rich environment, and to acceleration of reaction kinetics. (ii) If the reactant species prefer different liquid components, then after field-induced phase separation the reaction will be limited to the interface between coexisting phases and consequently slowed down.

Figure 2:
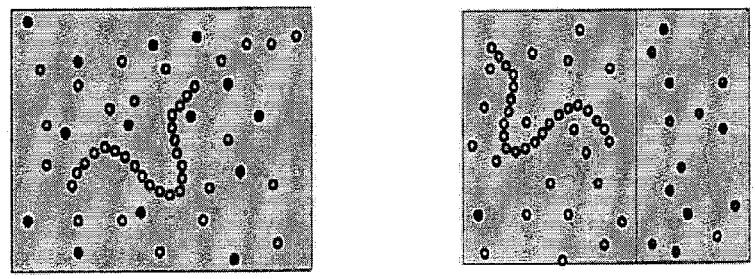
FIG. 2 schematically illustrates how field-induced phase separation can be used to influence the rate and spatial dependence of chemical reactions.

FIG. 2 schematically illustrates the latter case. In the left side is shown for simplicity two chemical species (solid dots and open dots) dissolved in a solvent, e.g. water. A chemical reaction, e.g. a polymerization, is taking place. When an electric field is applied (shown in the right side of FIG. 2), the active components can be separated to different locations (here the "solid" molecules are shown on the right while the "open" molecules stay on the left). The chemical reaction is thus limited to the interface, and the reaction kinetics consequently slowed down considerably.

The control of the kinetics and spatial dependence of chemical reactions is not limited to reactions occurring in mixtures. The above effects can also occur for chemical reactions in one pure solvent.

The phase transition can be applied in microfluidics optics, because, in general, the liquid components of the mixture have different indices of refraction. A light wave will not be deflected when it passes through a homogeneous mixture if the components are transparent enough. However, once demixing occurs, interfaces are created between coexisting phases that will scatter, deflect, or refract the light, and this can be used to create optical switches or lenses in a microfluidic system coupled to an external light source. Here again, the reversibility of the phase separation is advantageous.

Figure 3A:
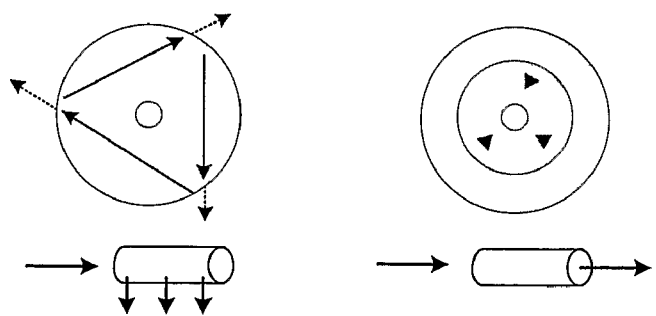
FIG. 3A to FIG. 3D schematically show examples of optical applications in which electrically-controlled demixing in liquids is used to control light.
Figure 3B:
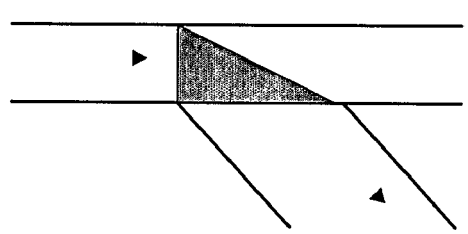
Figure 3C:
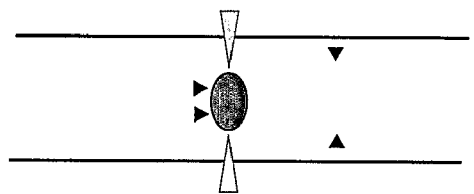
Figure 3D:
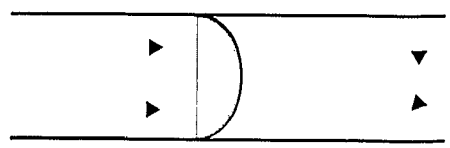

FIG. 3A to FIG. 3D schematically show examples of optical applications in which electrically-controlled demixing in liquids is used to control light. FIG. 3A shows a wave-guide filled with a liquid mixture comprised of two components having different indices or refraction. In the panel on the left, no electric field is applied, the mixture is homogeneous, the temperature is above the bimodal, and light passing along the "fiber" scatters around and is lost through the sides of the fiber. In the panel on the right, an electric field is applied by using a thin wire along the cylinder's axis, causing the mixture to be separated into a "core" comprised mainly of the high index of refraction component surrounded by a "cladding" of mainly the lower index of refraction component. As a result light is trapped in the core and so is transmitted along the length of the fiber. FIGS. 3B, 3C, and 3D show how light can be deflected, scattered or focused respectively when it passes through a microchannel with a suitable arrangements of electrodes. In FIG. 3B, the electrodes are triangular or similar in shape, facing each other "sandwiching" the mixture between them; In FIG. 3C the two electrodes are sharp "needle-like" structures, facing each other; in FIG. 3D the electrodes are lens-shaped or have a similar shape, and are facing each other sandwiching the liquid in between them.

Figure 4:
FIG. 4 schematically shows liquid separation in microfluidic channels.

FIG. 4 schematically shows liquid separation in microfluidic channels. Seen in the figure is a microchannel which has two thin electrodes (20) fabricated along its length. A liquid comprised of mixture of two components flows through the channel from the left to right. Application of voltage to the electrodes produces an electric field which causes spatial separation of the components with one component forming a layer close to the walls, while the second component stays in the center, thus enabling the liquids to be diverted into different channels.

Another example of an application of the method of the invention is to make a window become opaque with a push of a button. The window is comprised of two flat glass or plastic layers coated with thin electrodes (30) with a liquid layer (40) comprised of two transparent liquids between them. The two transparent liquids are mixed above the binodal temperature, and the window is transparent. The electrodes (30) are patterned with regular/irregular shapes. The application of a voltage causes phase separation of the mixtures, depending on the local electric field. The optical interfaces thus created scatter light and lead to the window becoming opaque.

Figure 5:
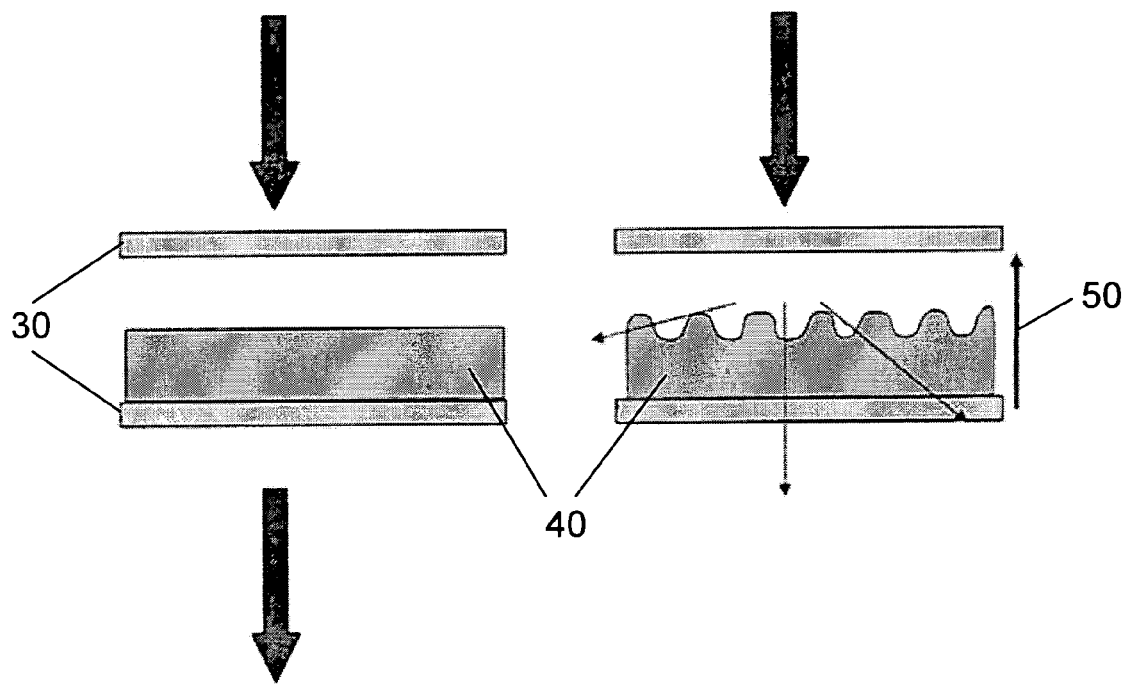
FIG. 5 schematically shows how the invention can be used to make a window become opaque with a push of a button.

FIG. 5 schematically shows another way of making a window become opaque with a push of a button. In this case the window is comprised of two flat layers coated with thin electrodes (30) with a liquid layer (40) comprised of two transparent immiscible liquids between them. In the left panel, no voltage is applied to the electrodes, everything is transparent, and light perpendicular to the window passes straight through essentially unaffected by the window. In the right panel, a non-uniform electric field (arrow (50)) is switched on in a direction perpendicular to the glass layers. This causes the liquid interface to become unstable due to the strong electrostatic forces and creates modulations on the surface of the liquid. These modulations scatter the incoming beam, and very little light is transmitted. The window will look white (milky). The transition is reversible.

Although embodiments of the invention have been described by way of illustration, it will be understood that the invention may be carried out with many variations, modifications, and adaptations, without exceeding the scope of the claims.

BIBLIOGRAPHY

[1] L. D. Landau & E. M. Lifshitz, *Electrodynamics of Continuous Media*, 1st ed., Nauka, Moscow (1957).
[2] P. Debye and K. Kieboth, *J. Chem. Phys.* 42, 3155 (1965).
Y. Tsori, F. Tournilhac & L. Leibler, *Nature* 430, 544 (2004).
[4] Yoav Tsori and Ludwik Leibler, PNAS, vol. 104, no. 18, May 1, 2007; published online Apr. 18, 2007.

The invention claimed is:

1. A method of reversible phase separation in liquid mixtures comprising two or more components said method comprising the steps of:
   a) inserting said liquid mixture between suitably shaped and positioned electrodes; and
   b) applying a voltage to said electrodes in order to produce a non-uniform electric field between said electrodes to cause said phase separation of said liquid mixture;
   said method characterized in that, said liquid mixture must contain dissociated positive or negative ions.

2. The method of claim 1 used to produce electrical field controlled lubrication, said method comprising:
   a) providing a liquid mixture comprising two or more components and containing dissociated positive or negative ions;
   b) providing suitably shaped and positioned electrodes;
   c) inserting said liquid mixture between said electrodes; and
   d) applying a voltage to said electrodes in order to produce a non-uniform electric field between said electrodes.

3. The method of claim 1 used to influence the kinetics and spatial dependence of chemical reactions in liquid environments, said method comprising:
   a) providing a liquid mixture comprising two or more components and containing dissociated positive or negative ions;
   b) providing suitably shaped and positioned electrodes;
   c) inserting said liquid mixture between said electrodes; and
   d) applying a voltage to said electrodes in order to produce a non-uniform electric field between said electrodes.

4. The method of claim 1 used to control the propagation of light, said method comprising:
   a) providing a liquid mixture comprising two or more components and containing dissociated positive or negative ions;
   b) providing suitably shaped and positioned electrodes;
   c) inserting said liquid mixture between said electrodes; and
   d) applying a voltage to said electrodes in order to produce a non-uniform electric field between said electrodes.

5. The method of claim 1 used to control the opacity of a window, said method comprising:
   a) providing a liquid mixture comprising two or more components and containing dissociated positive or negative ions;
   b) providing two parallel transparent sheets coated with thin electrodes that are patterned with regular/irregular shapes;
   c) inserting said liquid mixture between said electrodes; and
   d) applying a voltage to said electrodes in order to produce a non-uniform electric field between said electrodes.

* * * * *